GEORGE S. EATON.

Improvement in Moldings for Coffins, &c.

No. 127,966. Patented June 18, 1872.

Witnesses:
A. W. Almqvist
George W. Mabee

Inventor:
George S. Eaton
Per Munn & Co.
Attorneys.

UNITED STATES PATENT OFFICE.

GEORGE S. EATON, OF WILLIAMSBURG, NEW YORK.

IMPROVEMENT IN MOLDINGS FOR COFFINS, &c.

Specification forming part of Letters Patent No. 127,966, dated June 18, 1872; antedated June 1, 1872.

Specification describing a certain Improvement in Molding for Coffins, &c., invented by GEORGE S. EATON, of Williamsburg, in the county of Kings and State of New York.

Figure 1:
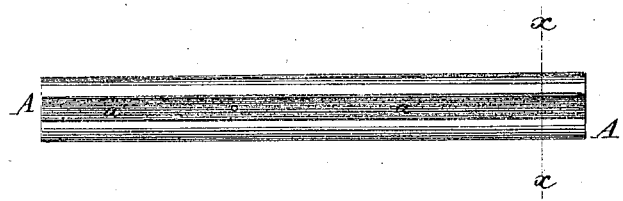
Figure 2:

Figure 1 represents a piece of molding illustrating my improvement. Fig. 2 is a cross-section of the same taken through the line $x\,x$, Fig. 1.

My invention has for its object to furnish an improved molding to take the place of the ordinary half-round molding for coffins, and which may be applied to articles of furniture; and it consists in the molding constructed as hereinafter more fully described.

A represents a piece of molding which is made in the same way as the ordinary half-round molding. The die by which the strip of brass is brought to the required form is made of such a shape as will form a groove, $a'$, in the outer or convex side of the said strip. The concavity of the brass is then filled with solder in the ordinary manner. The groove $a'$ is then wet with mucilage, glue, or other adhesive substance, that will remain liquid for a short time. Black flocks is then sprinkled in the groove, which, as the adhesive substance dries, will be held securely in place, and will give the molding the appearance of having a strip of cloth extended along it longitudinally. If desired, a strip of satin, velvet, or other cloth may be placed in the groove $a'$, and secured with the adhesive substance. For some uses it may be advisable to use flocks or strips of cloth of some other color than black. For the cheaper moldings the groove $a'$ may be simply painted black, but I prefer to use the flocks, as giving it a more finished appearance. If desired, two grooves, $a'$, may be formed in the molding A to receive the flocks, but I prefer to use only one, as giving the molding a neater appearance than it would have if more than one groove were made, while, at the same time, it enables the molding to be made narrower. The molding may be made of wood or metal, as may be desired.

Having thus described my invention, I claim as new and desire to secure by Letters Patent—

An improved molding, having a groove, $a'$, formed longitudinally in its outer or convex surface to adapt it to receive flocks, cloth, or paint, substantially as herein shown and described, and for the purpose set forth.

The above specification of my invention signed by me this 30th day of October, 1871.

GEORGE S. EATON.

Witnesses:
JAMES T. GRAHAM,
T. B. MOSHER.